(12) United States Patent
Cohen et al.

(10) Patent No.: US 9,729,860 B2
(45) Date of Patent: Aug. 8, 2017

(54) INDIRECT REFLECTION SUPPRESSION IN DEPTH IMAGING

(71) Applicant: MICROSOFT TECHNOLOGY LICENSING, LLC, Redmond, WA (US)

(72) Inventors: David Cohen, Nesher (IL); Giora Yahav, Haifa (IL); Asaf Pellman, Bet-Yehosha (IL); Amir Nevet, Haifa (IL); Shahram Izadi, Girton (GB)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 600 days.

(21) Appl. No.: 13/902,605

(22) Filed: May 24, 2013

(65) Prior Publication Data

US 2014/0347443 A1    Nov. 27, 2014

(51) Int. Cl.
*H04N 13/02* (2006.01)
*H04N 5/222* (2006.01)
(Continued)

(52) U.S. Cl.
CPC ......... *H04N 13/0271* (2013.01); *G01B 11/22* (2013.01); *G01S 7/4876* (2013.01);
(Continued)

(58) Field of Classification Search
None
See application file for complete search history.

(56) References Cited

U.S. PATENT DOCUMENTS

| 2005/0111705 A1* | 5/2005 | Waupotitsch ...... G06K 9/00255 |
| | | 382/118 |
| 2006/0192938 A1 | 8/2006 | Kawahito |

(Continued)

FOREIGN PATENT DOCUMENTS

| CN | 102027388 A | 4/2011 |
| CN | 102073050 A | 5/2011 |

(Continued)

OTHER PUBLICATIONS

Falie et al., "Further investigations on ToF cameras distance errors and their corrections," Circuits and Systems for Communications, 2008. ECCSC 2008, Jul. 10-11, 2008, pp. 197-200, IEEE.*

(Continued)

*Primary Examiner* — Joseph Ustaris
*Assistant Examiner* — Edemio Navas, Jr.
(74) *Attorney, Agent, or Firm* — Alleman Hall Creasman & Tuttle LLP (57) ABSTRACT

A depth-sensing method for a time-of-flight depth camera includes irradiating a subject with pulsed light of spatially alternating bright and dark features, and receiving the pulsed light reflected back from the subject onto an array of pixels. At each pixel of the array, a signal is presented that depends on distance from the depth camera to the subject locus imaged onto that pixel. In this method, the subject is mapped based on the signal from pixels that image subject loci directly irradiated by the bright features, while omitting or weighting negatively the signal from pixels that image subject loci under the dark features.

20 Claims, 7 Drawing Sheets

(51) Int. Cl.
*G01B 11/22* (2006.01)
*G01S 17/48* (2006.01)
*G01S 17/89* (2006.01)
*G01S 7/487* (2006.01)

(52) U.S. Cl.
CPC .............. *G01S 17/48* (2013.01); *G01S 17/89* (2013.01); *H04N 5/2226* (2013.01)

(56) References Cited

U.S. PATENT DOCUMENTS

| | | | | |
|---|---|---|---|---|
| 2006/0197937 | A1* | 9/2006 | Bamji | G01C 3/08 356/5.01 |
| 2006/0285650 | A1* | 12/2006 | Hodge | H04M 15/00 379/32.01 |
| 2007/0023494 | A1* | 2/2007 | Haraszti | B42D 15/0033 235/12 |
| 2010/0202667 | A1* | 8/2010 | Ren | G06K 9/00604 382/117 |
| 2010/0309351 | A1* | 12/2010 | Smith | H04N 5/335 348/280 |
| 2011/0037849 | A1 | 2/2011 | Niclass et al. | |
| 2011/0274366 | A1 | 11/2011 | Tardif | |
| 2011/0298918 | A1 | 12/2011 | McEldowney | |
| 2012/0033045 | A1 | 2/2012 | Schweizer et al. | |
| 2012/0069176 | A1 | 3/2012 | Park et al. | |
| 2012/0081360 | A1* | 4/2012 | Uehira | G01B 11/2545 345/419 |
| 2012/0170602 | A1* | 7/2012 | Hikmet | C09K 11/7731 372/31 |
| 2012/0176476 | A1 | 7/2012 | Schmidt et al. | |
| 2012/0281087 | A1* | 11/2012 | Kruse | G01B 11/25 348/136 |
| 2012/0300062 | A1* | 11/2012 | Pandharkar | G01S 17/89 348/135 |
| 2012/0314031 | A1* | 12/2012 | Shotton | H04N 13/0203 348/46 |

FOREIGN PATENT DOCUMENTS

| | | | | |
|---|---|---|---|---|
| DE | WO 2012107574 | A1 * | 8/2012 | G01S 7/497 |
| EP | 2538242 | A1 | 12/2012 | |
| WO | 2012107574 | A1 | 8/2012 | |

OTHER PUBLICATIONS

Jiménez et al., "Modelling and Correction of Multipath Interference in Time of Flight Cameras," In IEEE Conference on Computer Vision and Pattern Recognition, Jun. 16, 2012, 8 Pages.*

Fuchs et al., Multipath Interference Compensation in Time-of-Flight Camera Images, In 20th International Conference on Pattern Recognition, Aug. 23, 2010, 4 Pages.*

European Patent Office, International Search Report & Written Opinion for PCT Patent Application No. PCT/US2014/039256, Sep. 16, 2014, 13 Pages.

Falie, et al., "Further Investigations on ToF Cameras Distance Errors and Their Corrections", In 4th European Conference on Circuits and Systems for Communications, Jul. 10, 2008, pp. 197-200.

Jimenez, et al., "Modelling and Correction of Multipath Interference in Time of Flight Cameras", Retrieved at <<http://ieeexplore.ieee.org/stamp/stamp.jsp?tp=&arnumber=6247763>>, In IEEE Conference on Computer Vision and Pattern Recognition, Jun. 16, 2012, pp. 8.

Fuchs, Stefan, "Multipath Interference Compensation in Time-of-Flight Camera Images", Retrieved at <<http://ieeexplore.ieee.org/stamp/stamp.jsp?tp=&arnumber=5597396>>, In 20th International Conference on Pattern Recognition, Aug. 23, 2010, pp. 4.

International Preliminary Examining Authority of the European Patent Office, Second Written Opinion Issued in Application No. PCT/US2014/039256, Apr. 17, 2015, WIPO, 8 Pages.

IPEA European Patent Office, International Preliminary Report on Patentability Issued in Patent Application No. PCT/US2014/039256, Aug. 11, 2015, WIPO, 8 pages.

Falie, D. et al., "Further investigations on ToF cameras distance errors and their corrections." 4th European Conference on Circuits and Systems for Communications, 2008, Jul. 2008, 4 pages.

Falie, D. et al., "Distance errors correction for the Time of Flight (ToF) Cameras," IEEE International Workshop on Imaging Systems and Techniques, 2008, Sep. 2008, 4 pages.

The State Intellectual Property Office of China, First Office Action and Search Report Issued in Chinese Patent Application No. 201480029917.2, Dec. 21, 2016, China, 13 pages. (Submitted with partial English translation of Office Action and Search Report).

* cited by examiner

INDIRECT REFLECTION SUPPRESSION IN DEPTH IMAGING

BACKGROUND

In time-of-flight (TOF) depth imaging, a subject is irradiated by pulsed or otherwise modulated probe light. Some of the probe light reflects back from the subject to an imaging photodetector. The pixel elements of the photodetector are addressed in groups, in synchronicity with the modulated probe light. In this approach, the integration periods for the different groups of pixel elements may differ in phase or in total integration time, such that a pixel-resolved time of flight of the probe light from its origin at the probe emitter, out to the subject, and back to the photodetector, is discernible based on the relative amounts of light received in corresponding elements of the different groups. From the time of flight computed at a given pixel of the photodetector, the depth of the subject locus imaged by that pixel—i.e., the distance away from the depth camera—is computed.

In the approach summarized above, the signal-to-noise ratio for depth measurement may be eroded by indirect reflection of the probe light from one subject locus to another, and then to the photodetector. The prolonged time of flight of indirectly reflected probe light may falsely increase the measured depth of the second locus. For this reason, systematic measurement error may be observed with subjects prone to indirect reflection.

SUMMARY

One embodiment of this disclosure provides a depth-sensing method to be enacted with a time-of-flight depth camera. The method includes irradiating a subject with pulsed light of spatially alternating bright and dark features, and receiving the pulsed light reflected back from the subject onto an array of pixels. At each pixel of the array, a signal is presented that depends on distance from the depth camera to the subject locus imaged onto that pixel. In this method, the subject is mapped based on the signal from pixels that image subject loci directly irradiated by the bright features, while omitting or weighting negatively the signal from pixels that image subject loci under the dark features.

This Summary is provided to introduce a selection of concepts in simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Aspects of this disclosure will now be described by example and with reference to the illustrated embodiments listed above. Components, process steps, and other elements that may be substantially the same in one or more embodiments are identified coordinately and are described with minimal repetition. It will be noted, however, that elements identified coordinately may also differ to some degree. It will be further noted that the drawing figures included in this disclosure are schematic and generally not drawn to scale. Rather, the various drawing scales, aspect ratios, and numbers of components shown in the figures may be purposely distorted to make certain features or relationships easier to see.

Figure 1:
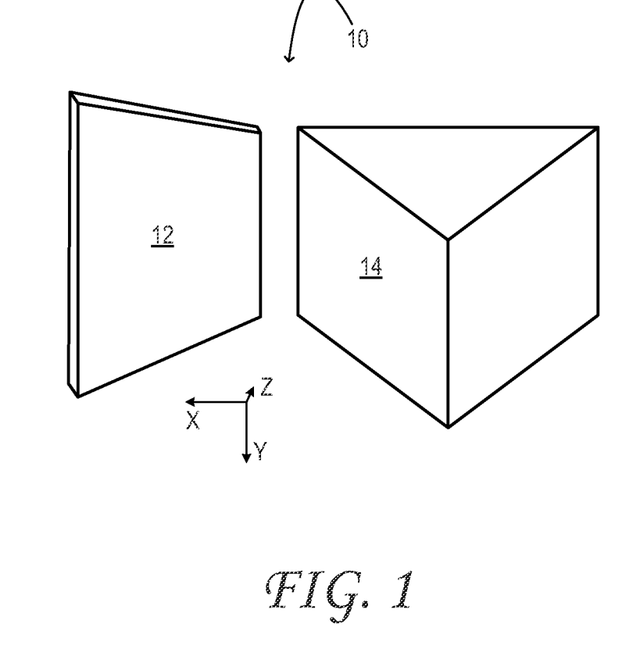
FIG. 1 shows aspects of an example subject applicable to TOF depth sensing in accordance with an embodiment of this disclosure.

FIG. 1 shows aspects of an example subject 10 applicable to the depth-sensing approaches disclosed herein. The subject, in this case, is a pair of geometric solids that include a first area 12 and an adjacent second area 14. Both the first and second areas are planar surfaces parallel to the vertical Y axis. The first and second areas are set at an angle to each other, extending farthest along the depth axis Z in the region where they approach each other. In this example, at least the first area is a diffuse reflector of the probe light used for depth sensing. In other words, when illuminated by the probe light, first area 12 may diffusively reflect such light onto second area 14.

In FIG. 1, the configuration and orientation of subject 10 are chosen merely to simplify the discussion hereinafter; no aspect of the configuration or orientation are in any way limiting of the subject matter herein. On the contrary, this disclosure is compatible with a broad range of depth-sensing subjects—from simple geometric structures such as walls and ceilings, to more complex rectilinear structures such as furniture, to highly complex, curved and moving structures such as human beings.

Figure 2:
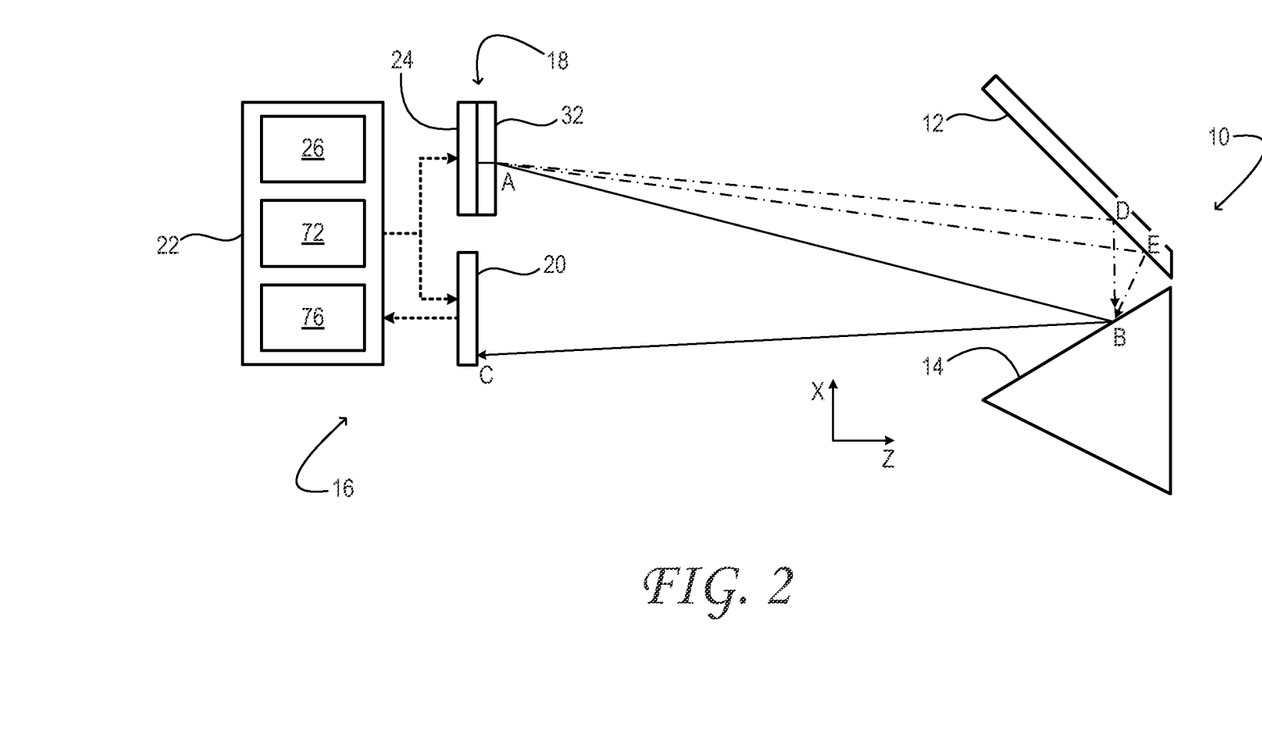
FIG. 2 shows a plan view of the subject of FIG. 1 together with aspects of a depth camera in accordance with an embodiment of this disclosure.

FIG. 2 shows subject 10 in plan view, together with aspects of depth camera 16. In some embodiments, the depth camera may be positioned anywhere from 0.1 to 5 meters away from subject, although other ranges are contemplated as well. As shown in FIG. 2, depth camera 16 includes a probe emitter 18, an imaging photodetector 20, and a controller 22. The probe emitter may be configured to irradiate the subject with pulsed or otherwise modulated probe light. It will be noted that the term 'pulse', as used herein, is not limited to a rectangular pulse, but extends to virtually any periodic modulation waveform, including, but not limited to, a sinusoidally modulated waveform. Moreover, the nature of the probe emitter may differ in the various embodiments of this disclosure. In some embodiments, the probe emitter may include a modulated laser 24, such as an infrared (IR) or near-infrared (NIR) laser. In other embodiments, the probe emitter may include on or more high-power light-emitting diodes (LEDs).

Imaging photodetector 20 includes an array of depth-sensing pixels. The imaging photodetector is configured to receive onto the array at least some of the pulsed or modulated probe light reflected back from the subject. Each pixel of the array is configured to present a signal dependent on distance from the depth camera to the locus of the subject imaged onto that pixel. Such distance is referred to herein as 'depth'. The imaging photodetector may also include various components not shown in the drawings, such as a collimating lens and wavelength filter, which may be arranged in front of the array.

Continuing in FIG. 2, controller 22 includes logic hardware to provide modulated drive signals to probe emitter 18 and to imaging photodetector 20, to synchronize the operation of these components. The controller is also configured to interrogate each pixel of the imaging photodetector to enable computation of a depth map of subject 10. In particular, logic 26 of controller 22 is configured to map the subject—or a scene that includes the subject—based on signal from the various pixels of the array. In some embodiments, repeated depth imaging may be used to assemble a time-resolved series of depth maps arranged as depth video. Analysis of the depth video may be used for gesture recognition or other forms of natural user input (NUI), for example.

Figure 3:
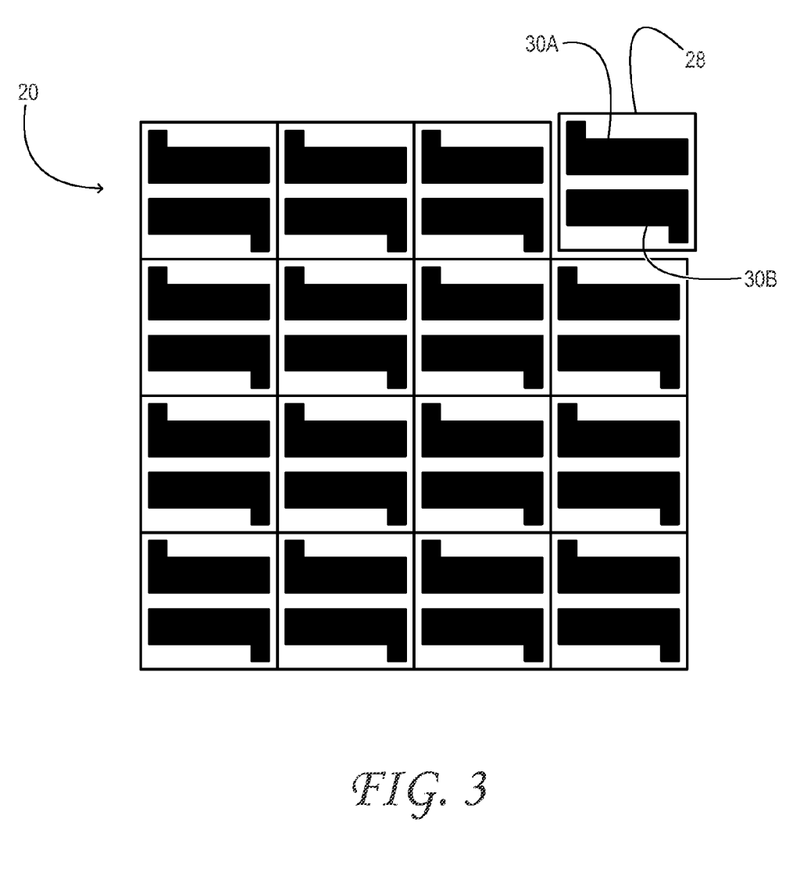
FIG. 3 shows aspects of an imaging photodetector in accordance with an embodiment of this disclosure.

FIG. 3 shows aspects of imaging photodetector 20 in one embodiment. In particular, the drawing shows an array of pixels 28. Each pixel includes a first pixel element 30A, an adjacent second pixel element 30B, and may also include additional pixel elements not shown in the drawing. Each pixel element may include one or more finger gates, transfer gates and/or collection nodes epitaxially formed on a semiconductor substrate. The pixel elements of each pixel may be addressed so as to provide two or more integration periods synchronized to the pulsed emission from the probe emitter. The integration periods may differ in phase and/or total integration time. Based on the relative amount of charge accumulated on the pixel elements during the different integration periods, the distance out to the reflecting locus of the subject may be obtained. In another embodiment, the probe emitter and the first pixel element are energized synchronously, while the second pixel element is energized 180° out of phase with respect to the first pixel element. Based on the relative amount of charge integrated in the first and second pixel elements, the phase angle of the reflected light pulse received in the photodetector is computed versus the probe modulation. From the phase angle, the distance out to the reflecting locus may be obtained.

The depth-sensing approach described above gives reliable results under some conditions, but is prone to significant measurement error under other conditions. One source of error is indirect reflection of the probe light, as described below with continued reference to FIG. 2. In this drawing, the desired light path for assessing the depth of locus B is the two-segment path ABC. However, numerous other paths may also result in probe light reaching photodetector 20 along ray BC—among them the three-segment paths ADBC and AEBC. Light reflected along a three-segment path is received at a larger-than-expected phase angle, which erroneously lengthens the measured depth of locus B.

In the illustrated example, indirect reflection is a consequence of the orientation of first area 12 relative to second area 14, which defines a concavity. Although reflection along any three-segment path will typically be less intense than the direct, two-segment reflection, various factors may increase the significance of indirect reflection as a noise source. For instance, if first area 12 is significantly reflective—and especially diffusely reflective—of the probe light, then the amount and angular content of the indirect reflection may be increased. Naturally, the larger the size of first area 12, the greater will be the amount of indirectly reflected light that reaches photodetector 20 along BC.

To address this issue while providing still other advantages, probe emitter 18 may be configured to irradiate subject 10 with pulsed light of spatially alternating bright and dark features. Logic 26 may be configured to map the subject based on the signal from pixels that image subject loci directly irradiated by the bright features, while omitting or weighting negatively the signal from pixels that image subject loci under the dark features. This approach increases the signal-to-noise ratio for sensing the depth of subject loci under the bright features, because it reduces the effective area of the subject from which indirect reflections can occur. At the same time, the intensity of the direct, two-segment reflection from the bright features is increased, because the entire output of the emitter is concentrated on the bright features.

Figure 4:
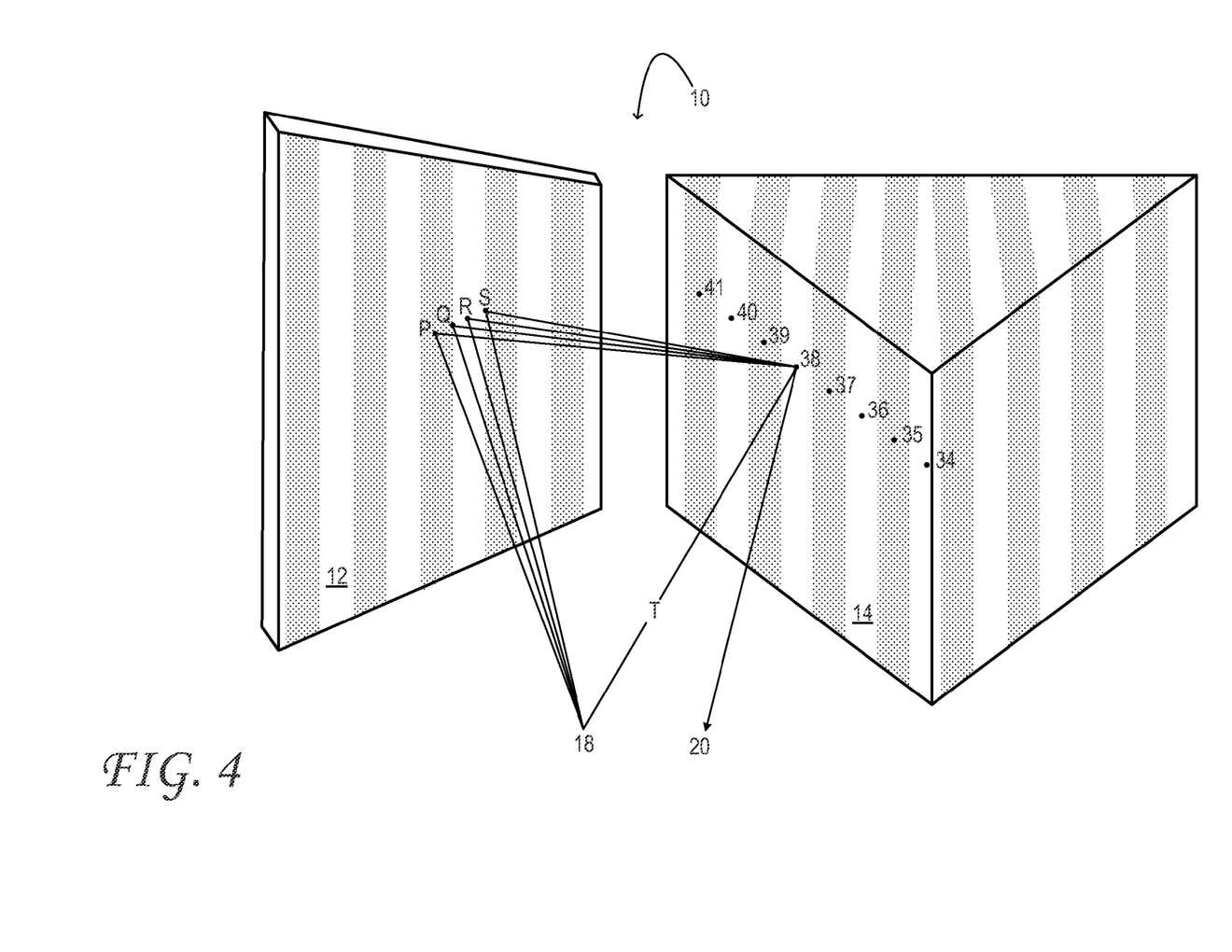
FIG. 4 shows the subject of FIG. 1 irradiated with a pattern of spatially alternating bright and dark features, in accordance with an embodiment of this disclosure.

To enact this approach, probe emitter 18 of FIG. 2 includes, in one embodiment, a low-loss optic 32 configured to receive pulsed light of a continuous (e.g., Lambertian) distribution, and to release the pulsed light in a pattern of spatially alternating bright and dark features. The low-loss optic may include a diffraction grating or, in other examples, a series of refracting features, such as lenslets. In these and other embodiments, the spatially alternating bright and dark features may include a series of parallel light pins, as illustrated in FIG. 4. Furthermore, the low-loss optic may, in some non-limiting examples, be an active optic that can be switched on to provide the spatially alternating bright and dark features, and switched off to provide uniform irradiance of the subject.

Figure 5:
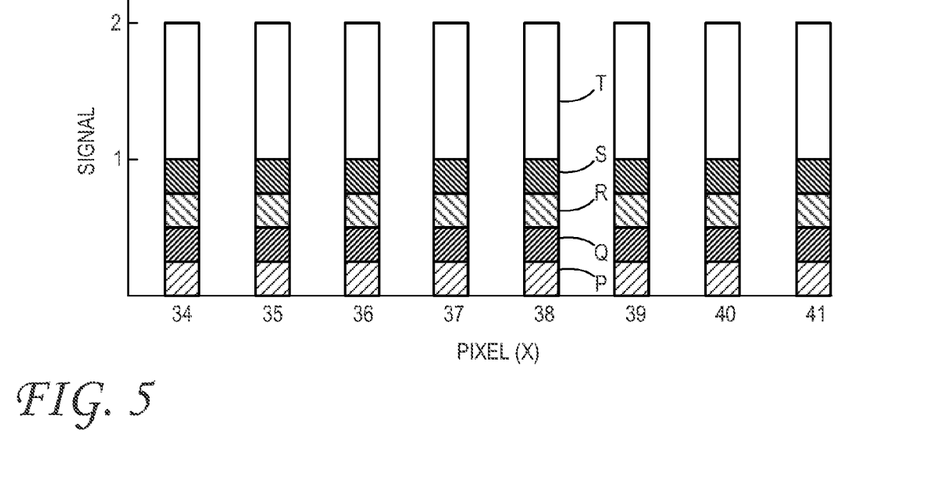
FIG. 5 is a graph showing contributions to signal intensity across a series of pixels of a depth-camera with uniform irradiance of the subject.
Figure 6:
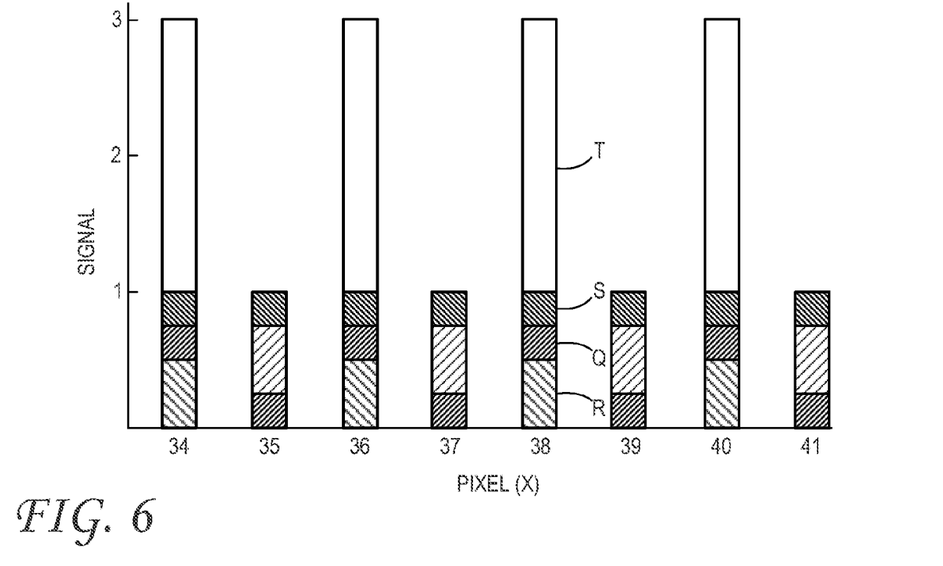
FIG. 6 is a graph showing contributions to signal intensity across a series of pixels of a depth-camera with structured irradiance of the subject, in accordance with an embodiment of this disclosure.

The modeling results of FIGS. 5 and 6 illustrate the basic advantage of the depth-sensing approach now disclosed. In these graphs, the height of each numbered vertical bar (34 through 41 in FIGS. 5 and 6) represents overall signal intensity from a pixel of the photodetector that images a corresponding locus of second area 14. These loci are assigned a corresponding number in preceding FIG. 4. In FIGS. 5 and 6, each vertical bar is divided into sections that show contributions to the signal intensity from the direct, two-segment reflection and from several three-segment reflections. For each numbered pixel, signal intensity from the direct, two-segment path is shown as an unshaded block, while the differently shaded blocks represent signal intensity from different three-segment reflections. At pixel 38, for instance, shaded block P represents signal intensity from a three-segment reflection from locus P (of FIG. 4), shaded block Q represents signal intensity from locus Q, shaded block R represents signal intensity from locus R, and shaded block S represents signal intensity from locus S. Unshaded block T, at pixel 38, represents signal intensity from the direct two-segment reflection.

The result of uniform irradiance of the subject with pulsed light is illustrated in FIG. 5. In this example, the signal intensity from the two-segment reflection is equal, at every pixel, to the combined signal intensity from the four three-segment reflections, so that the total signal-to-noise ratio is 1:1.

FIG. 6 illustrates the result of irradiance with a series of light pins as shown in FIG. 4. Pixels 34, 36, 38, and 40 image loci under a bright feature of the structured irradiance, while 35, 37, 39, and 41 image loci under dark features. In the scenario represented in FIG. 6, the overall power delivered by the probe emitter is the same as in FIG. 5, but this power is concentrated exclusively on the bright features. Accordingly, the signal intensity for the two-segment reflection is doubled under pixels 34, 36, 38, and 40. At example pixel 38, the signal intensity corresponding to the three-segment reflection via brightly illuminated locus R doubles also, but the one from dark locus P disappears entirely, and the intensities of the remaining three-segment reflections (Q and S) remain unchanged. Thus, the signal-to-noise ratio for depth sensing under the bright features is overall doubled to 2:1. Under the dark features, all signal intensity from the two-segment reflection vanishes, because these areas are not directly irradiated by probe light. Rather, all of the accumulated signal is due to a distribution of three-segment reflections.

Although the light pins are oriented vertically in FIG. 4, they may be oriented horizontally instead, or at any oblique angle. In embodiments where light pins are used, the orientation of the light pins may be adjusted according to the geometry of the imaged subject to more effectively suppress indirect reflections. Accordingly, depth camera 16 may include additional hardware for dynamically rotating the light pins during image acquisition to minimize a predicted or computed depth-sensing error (vide infra). It will be noted that the pattern of light pins here described is only one of many patterns having alternating bright and dark features. Additional patterns include a grid made from crisscrossed light pins, or a matrix of bright dots on a dark background.

The configurations described above enable various depth-sensing methods. Accordingly, some such methods are now described, by way of example, with continued reference to the above configurations. It will be understood, however, that the methods here described, and others equally within the scope of this disclosure, may be enabled by other configurations as well. Further, some of the process steps described and/or illustrated herein may, in some embodiments, be omitted without departing from the scope of this disclosure. Likewise, the indicated sequence of the process steps may not always be required to achieve the intended results, but is provided for ease of illustration and description. One or more of the illustrated actions, functions, or operations may be performed repeatedly, depending on the particular strategy being used.

Figure 7:
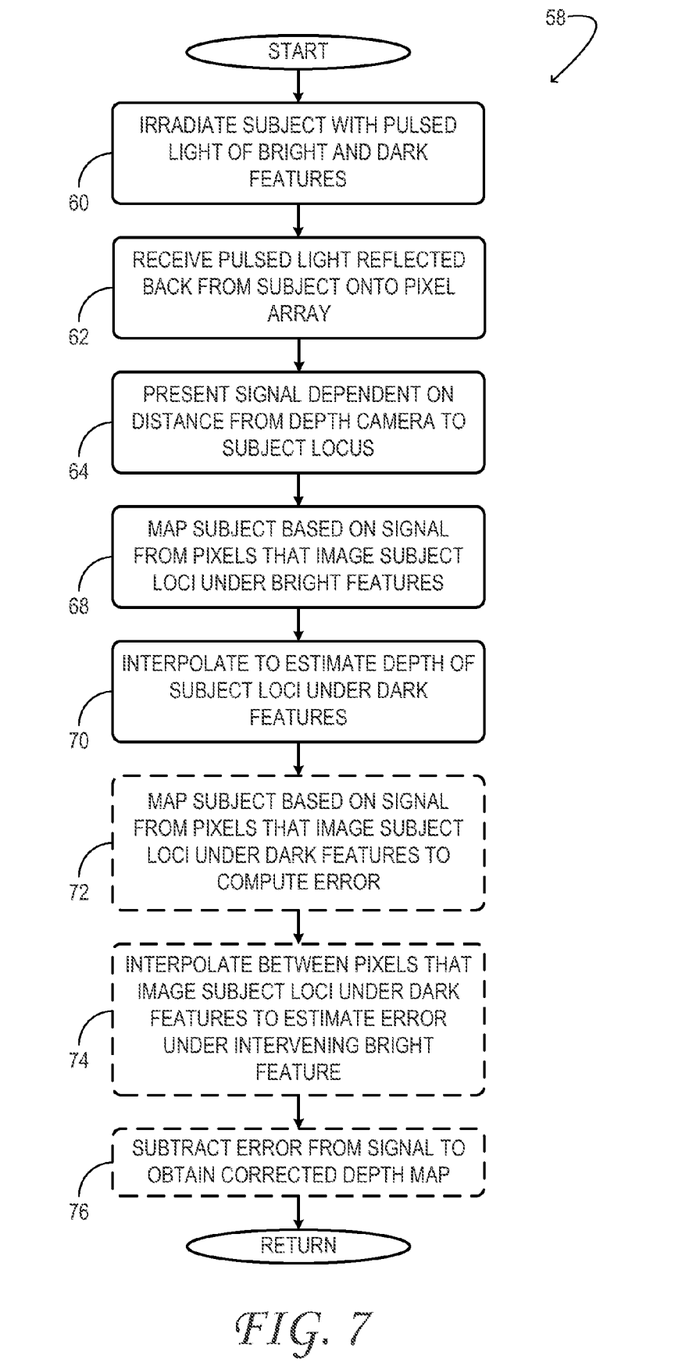
FIG. 7 illustrates an example depth-sensing method in accordance with an embodiment of this disclosure.

FIG. 7 illustrates an example depth-sensing method 58 to be enacted with a TOF depth camera. At 60 of method 58, a subject is irradiated with pulsed light of spatially alternating bright and dark features. At 62, the pulsed light reflected back from the subject is received onto an array of pixels of an imaging photodetector of the depth camera. At 64 a signal is presented at each pixel of the array. For each pixel, the signal is dependent on the distance from the depth camera to the locus of the subject imaged onto that pixel. At 68 the subject is mapped based on the signal from pixels that image subject loci directly irradiated by the bright features, while omitting or weighting negatively the signal from pixels that image subject loci under the dark features.

At 70 the depth of the subject loci lying under the dark features is estimated by interpolation. In particular, interpolation may be enacted between pixels that image subject loci under consecutive bright features to estimate the depth of a subject locus under an intervening dark feature. The interpolation may be linear, quadratic, etc. In one embodiment, the above process may yield a depth map having a depth coordinate Z associated with each pixel (X, Y) of the array.

In some embodiments, signal from pixels corresponding to subject loci under the dark features may be used to an advantage. At optional steps 72 and 74, for example, an area-wise error map of the subject is computed. The error map may be based on the signal from pixels that image subject loci under the dark features. Because the signal from these pixels directly reports on the signal error due to ambient light and indirect reflections, it is a sound measure of depth-sensing uncertainty. At 74, interpolation is enacted between pixels that image subject loci under consecutive dark features to estimate the signal error from an intervening pixel mapped to a subject locus under an intervening bright feature. In some applications, an error map constructed in this manner may be used to establish appropriate weighting factors for different regions of a depth map that are fit to a model—such as a human skeletal model used for gesture recognition.

For many applications, the aspects described hereinabove are sufficient to increase the signal-to-noise ratio of TOF depth sensing to a desirable level. However, further refinement is also possible. Accordingly, method 72 of FIG. 4 includes additional optional step 76. At 76, the error computed for each pixel is subtracted from the signal of that pixel to obtain a corrected depth map.

To enact the optional steps of method 72, controller 22 of FIG. 2 may include logic 72, configured to interpolate between pixels that image subject loci under consecutive dark features to estimate the error in the signal from an intervening pixel mapped to a subject locus under an intervening bright feature. Such logic may also be configured to subtract the error from the signal from each pixel.

No aspect of the foregoing method should be understood in a limiting sense, because numerous variations and extensions lie fully within the spirit and scope of this disclosure. For instance, several extensions to the above method is based on enacting triangulation-based depth measurement concurrent with the TOF depth measurement, and combining the results to secure advantages unavailable with either method alone. Naturally, the structured light produced by depth camera 16 is also suitable for triangulation-based depth sensing, so these extensions require no additional irradiation hardware. In one embodiment, the depth of a subject locus can be triangulated based on an apparent position of one or more of the bright features in an image of the pulsed light reflected back from the subject. Accordingly, controller 22 of FIG. 2 may include logic 74 configured to triangulate depth of a subject locus based on the apparent position of one or more of the bright features in the pulsed light reflected back from the subject.

In a more particular approach, the triangulated depth may be used to bracket a predetermined depth range onto which the subject is mapped. In other words, rough triangulation may be used to establish that the interesting features of the subject lie between, e.g., 1 and 2 meters from the depth camera. The system may then adjust the modulation period of the probe emitter to provide optimum sensitivity in this range. In another approach, triangulation may be used to correct an unexpected, outlying point in a depth map computed by TOF. Specifically, the mapping referred to in method 72 may place a subject locus at an unexpected depth. Another depth value, computed by triangulation, may be used to correct the unexpected depth and provide an overall more consistent and less noisy depth map. In yet another approach, area-wise comparison of TOF to triangulation-based depth values may be used to obtain an area-wise reliability metric for depth sensing. This resource can be used in model fitting, just like the error map referred to hereinabove. To support these features, depth camera 16 may include triangulation logic 76, as shown in FIG. 2.

In yet another embodiment, a depth-sensing method may be enacted with a depth camera configured to acquire gated images under three different gating conditions. Here, the probe emitter may be configured to emit (a) uniform irradiance, (b) spatially alternating bright and dark features, or (c) a combination of uniform irradiance and spatially alternating bright and dark features. To this end, the low-loss optic referred to hereinabove may be an active optic switchable by a control circuit between uniform and patterned irradiance. When the combination is used, depth is computed using a more advanced algorithm that makes no assumption about the phase of each image. One advantage of using a combination of irradiance modalities is that, depending on the geometry and optical properties of the subject, a given gating condition may be less exposed to multipath reflections. When this is the case, uniform irradiance may be used, for increased resolution.

As evident from the foregoing description, the methods and processes described herein may be tied to a computing system of one or more computing devices. Such methods and processes may be implemented as a computer-application program or service, an application-programming interface (API), a library, and/or other computer-program product.

Figure 8:
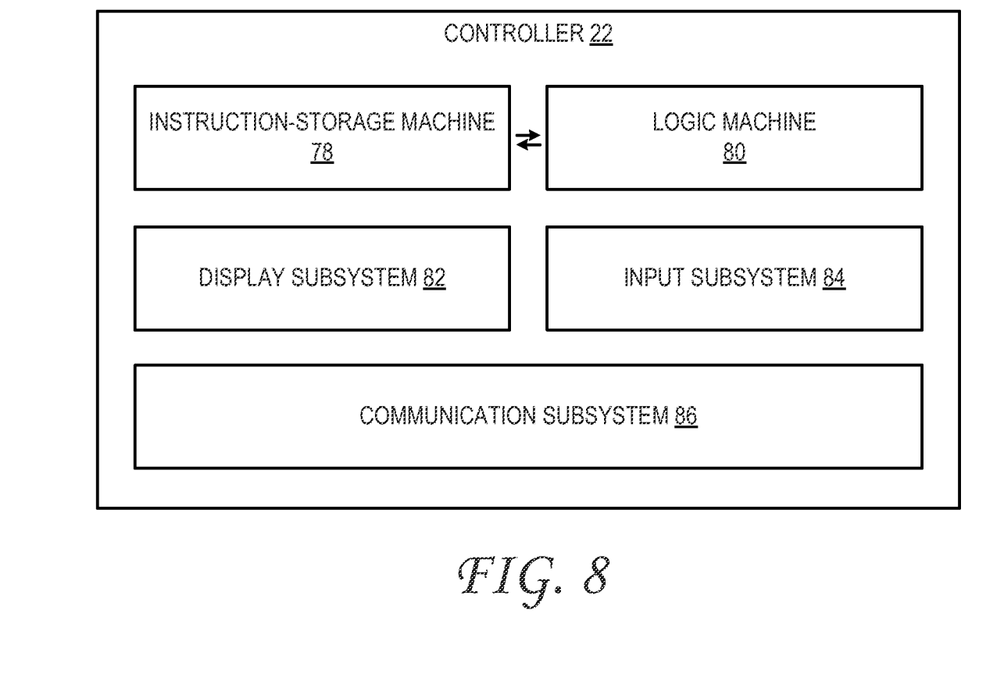
FIG. 8 shows additional aspects of a controller in accordance with an embodiment of this disclosure.

FIG. 8 is a high-level diagram showing additional aspects of controller 22—a computer system configured to support the methods and processes described herein. As noted hereinabove, the controller includes a logic machine 78 and an instruction-storage machine 80. Controller 22 may optionally include a display subsystem 82, an input subsystem 84, a communication subsystem 84, and/or other components not shown in FIG. 8.

Logic machine 78 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

Logic machine 78 may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Instruction-storage machine 80 includes one or more physical devices configured to hold instructions executable by logic machine 78 to implement the methods and processes described herein. When such methods and processes are implemented, the state of the instruction-storage machine may be transformed—e.g., to hold different data. The instruction-storage machine may include removable and/or built-in devices; it may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. The instruction-storage machine may include volatile, nonvolatile, dynamic, static, read/write, read-only, random-access, sequential-access, location-addressable, file-addressable, and/or content-addressable devices.

It will be appreciated that instruction-storage machine 80 includes one or more physical devices. However, aspects of the instructions described herein alternatively may be propagated by a communication medium (e.g., an electromagnetic signal, an optical signal, etc.) that is not stored via a storage medium.

Aspects of logic machine 78 and instruction-storage machine 80 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms 'module', 'engine', or 'logic' may be used to describe an aspect of controller 22 implemented to perform a particular function. In some cases, a module or engine may be instantiated via logic machine 78 executing instructions held by instruction-storage machine 80. It will be understood that different programs or engines may be instantiated from the same application, service, code block, object, library, routine, API, function, etc. Likewise, the same module, and/or engine may be instantiated by different applications, services, code blocks, objects, routines, APIs, functions, etc. The terms 'module', 'engine', or 'logic' may encompass individual or groups of executable files, data files, libraries, drivers, scripts, database records, etc.

When included, display subsystem 82 may be used to present a visual representation of data held by instruction-storage machine 80. This visual representation may take the form of a graphical user interface (GUI). As the herein described methods and processes change the data held by the storage machine, and thus transform the state of the storage machine, the state of the display subsystem may likewise be transformed to visually represent changes in the underlying data. The display subsystem may include one or more display devices utilizing virtually any type of technology. Such display devices may be combined with logic machine 78 and/or instruction-storage machine 80 in a shared enclosure, or such display devices may be peripheral display devices.

When included, input subsystem 84 may comprise or interface with one or more user-input devices such as a keyboard, mouse, touch screen, or game controller. In some embodiments, the input subsystem may comprise or interface with selected NUI componentry. Such componentry may be integrated or peripheral, and the transduction and/or processing of input actions may be handled on- or off-board.

When included, communication subsystem 86 may be configured to communicatively couple controller 22 with one or more other computing devices. The communication subsystem may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow controller 22 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A depth-imaging method comprising:
with an infrared emitter of a depth-imaging time-of-flight (ToF) camera, irradiating a subject with temporally modulated light of spatially alternating bright and dark features;
receiving the modulated light reflected back from the subject onto an array of pixels of the ToF camera;
for each pixel of the array, outputting a ToF signal varying in response to a time of flight of the modulated light from the infrared emitter to a subject locus imaged at that pixel, and then back to the pixel; and
mapping the subject in three dimensions based on the ToF signal associated with subject loci directly irradiated by the bright features, while omitting or weighting negatively the ToF signal associated with subject loci under the dark features, the mapping exhibiting an improved signal-to-noise ratio relative to mapping under uniform subject illumination, due to exclusion of indirect reflection from subject loci under the dark features.

2. The method of claim 1 further comprising interpolating between pixels that image subject loci under consecutive bright features to estimate depth of a subject locus under an intervening dark feature.

3. The method of claim 1 further comprising triangulating depth of a subject locus based on position of one or more of the bright features in an image of the pulsed light reflected back from the subject.

4. The method of claim 3 wherein said mapping includes mapping onto a predetermined depth range, the method further comprising using the triangulated depth to bracket the predetermined depth range.

5. The method of claim 3 wherein said mapping places the locus of the subject at an unexpected depth, the method further comprising using the triangulated depth to correct the unexpected depth.

6. The method of claim 3 wherein said mapping yields a time-of-flight depth, the method further comprising comparing the time-of-flight depth to the triangulated depth to obtain an area-wise reliability metric for depth sensing.

7. The method of claim 1 wherein said mapping yields a depth map having a depth coordinate associated with each pixel of the array.

8. The method of claim 1 further comprising mapping the subject based on the signal from pixels that image subject loci under the dark features to compute an area-wise depth-sensing uncertainty.

9. The method of claim 1 wherein the depth camera is positioned 0.1 to 5 meters away from subject.

10. The method of claim 1 wherein the subject includes adjacent first and second areas, and wherein the first area, when illuminated, diffusively reflects light onto the second area.

11. A time-of-flight (ToF) depth-imaging camera comprising:
an infrared emitter configured to irradiate a subject with temporally modulated light of spatially alternating bright and dark features;
an imaging photodetector having an array of pixels and configured to receive the modulated light reflected back from the subject onto the array of pixels, each pixel of the array configured to output a ToF signal varying in response to a time of flight of the modulated light from the infrared emitter to a subject locus imaged at that pixel, and then back to the pixel; and
logic configured to map the subject in three dimensions based on the ToF signal associated with subject loci directly irradiated by the bright features, while omitting or weighting negatively the ToF signal associated with subject loci under the dark features, the mapping exhibiting an improved signal-to-noise ratio relative to mapping under uniform subject illumination, due to exclusion of indirect reflection from subject loci under the dark features.

12. The depth camera of claim 11 wherein the infrared emitter includes a modulated laser.

13. The depth camera of claim 11 wherein the infrared emitter includes a low-loss optic configured to receive pulsed light of a Lambertian distribution and to release the pulsed light in spatially alternating bright and dark features.

14. The depth camera of claim 13 wherein the low-loss optic includes a plurality of refractive elements.

15. The depth camera of claim 13 wherein the low-loss optic is an active optic that can be switched off to provide uniform irradiance of the subject.

16. The depth camera of claim 11 wherein the spatially alternating bright and dark features include a series of parallel light pins.

17. The depth camera of claim 11 further comprising logic configured to triangulate depth of a subject locus based on a position of one or more of the bright features in an image of the pulsed light reflected back from the subject.

18. The depth camera of claim 11 further comprising logic configured to:
interpolate between pixels that image subject loci under consecutive dark features to estimate an error in the signal from an intervening pixel mapped to a subject locus under an intervening bright feature; and
subtract the error from the signal from the intervening pixel.

19. A depth-imaging method comprising:
with an infrared emitter of a depth-imaging time-of-flight (ToF) camera, irradiating a subject with temporally modulated light of spatially alternating bright and dark features;
receiving the modulated light reflected back from the subject onto an array of pixels of the ToF camera;
for each pixel of the array, outputting a ToF signal varying in response to a time of flight of the modulated light from the infrared emitter to a subject locus imaged at that pixel, and then back to the pixel; and
mapping the subject in three dimensions based on the ToF signal associated with subject loci directly irradiated by the bright features, while weighting negatively the ToF signal associated with subject loci under the dark features, the mapping exhibiting an improved signal-to-noise ratio relative to mapping under uniform subject illumination, due to exclusion of indirect reflection from subject loci under the dark features.

20. The method of claim 19 wherein mapping the subject includes:
interpolating between pixels that image subject loci under consecutive dark features to estimate an error in the signal from an intervening pixel mapped to a subject locus under an intervening bright feature; and subtracting the error from the signal from the intervening pixel.

* * * * *